(12) United States Patent
Shi et al.

(10) Patent No.: US 12,289,018 B2
(45) Date of Patent: Apr. 29, 2025

(54) DIRECT DRIVE TRANSMISSION SYSTEM

(71) Applicant: AAC Technologies (Nanjing) Co., Ltd., Nanjing (CN)

(72) Inventors: Weiling Shi, Nanjing (CN); Shun Guo, Nanjing (CN); Yongjian Xue, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 212 days.

(21) Appl. No.: 18/322,624

(22) Filed: May 24, 2023

(65) Prior Publication Data
US 2024/0178727 A1    May 30, 2024

Related U.S. Application Data

(63) Continuation of application No. PCT/CN2022/144295, filed on Dec. 30, 2022.

(30) Foreign Application Priority Data

Nov. 25, 2022   (CN) .......................... 202223154738.2

(51) Int. Cl.
| | |
|---|---|
| *H02K 41/02* | (2006.01) |
| *H02K 1/14* | (2006.01) |
| *H02K 1/2791* | (2022.01) |
| *H02K 11/21* | (2016.01) |

(52) U.S. Cl.
CPC ............. *H02K 11/21* (2016.01); *H02K 1/148* (2013.01); *H02K 1/2791* (2022.01)

(58) Field of Classification Search
CPC .................................. H02K 41/02; H02K 5/02
See application file for complete search history.

(56) References Cited

FOREIGN PATENT DOCUMENTS

| CN | 209402387 U | * | 9/2019 |
|---|---|---|---|
| CN | 213461499 U | * | 6/2021 |
| WO | WO-2022047936 A1 | * | 3/2022 |

OTHER PUBLICATIONS

WO-2022047936-A1 Machine Translation (Year: 2022).*
CN-209402387-U Machine Translation (Year: 2019).*
CN-213461499-U Machine Translation (Year: 2021).*

* cited by examiner

*Primary Examiner* — Tran N Nguyen
*Assistant Examiner* — Masoud Vaziri
(74) *Attorney, Agent, or Firm* — Wiersch Law Group

(57) ABSTRACT

The disclosure provides a direct drive transmission system. The direct drive transmission system includes a mover unit and a stator unit driving the mover unit to move. The stator unit includes a stator assembly, two first end covers, and two first guide rails. The mover unit includes a mover assembly, two second end covers, and two second guide rails. The direct drive transmission system further includes a limiting structure. An end of the limiting structure close to each of the second end covers is located between the two second end covers. The stator assembly drives the mover assembly to cause the second guide rail to move along the first guide rail, such that the second end cover contacts a side wall of the limiting structure to realize limiting.

7 Claims, 4 Drawing Sheets

DIRECT DRIVE TRANSMISSION SYSTEM

TECHNICAL FIELD

The disclosure relates to the technical field of transmission systems, and in particular, to a direct drive transmission system.

BACKGROUND

With the development of a direct drive transmission system technology, a direct drive transmission system has been widely used in various direct drive motors.

The direct drive transmission system in the related art includes a plurality of stators and a plurality of movers. The stators drive the movers to move to form a linear drive effect. In an existing direct drive transmission system, for left and right stroke limiting of the direct drive motor, hard limiting is realized generally by contacting an end cover of a base with a limiting structure on an end cover of a slide.

However, in some compact motor structures in the related art, the end cover of the base and the end cover of the slide are zigzag staggered from each other, which makes the end cover of the slide and the end cover of the base relatively complicated. Moreover, in order to have a compact structure, it is easy to cause a small limiting contact area and poor reliability.

Therefore, there is a need to provide a new direct drive transmission system to solve the above problems.

SUMMARY

The technical problem to be solved in the disclosure is to provide a direct drive transmission system that is easy to assemble and has a large limiting area and high reliability.

In order to solve the above technical problem, the disclosure provides a direct drive transmission system, wherein the direct drive transmission system includes a mover unit and a stator unit driving the mover unit to move; the stator unit includes a stator assembly, two first end covers fixed to two opposite circumferential sides of the stator assembly, and two first guide rails fixed to a side of the stator assembly close to the mover unit and extending along a motion direction of the mover unit, the two first guide rails are spaced apart in parallel; the mover unit includes a mover assembly, two second end covers fixed to two opposite circumferential sides of the mover assembly, and two second guide rails fixed to a side of the mover assembly close to the stator unit and extending along the motion direction of the mover unit, the two second guide rails are arranged are spaced apart in parallel; the two second end covers are respectively arranged directly opposite to and apart from the two first end covers, the two second guide rails respectively abutting against the two first guide rails to form a slidable connection; wherein a spaced surfaces of the two first end covers and the two second end covers close to each other have an orthographic plane structure; and the direct drive transmission system further includes a limiting structure fixed to a side of the stator assembly close to the mover assembly, an end of the limiting structure close to the two second end covers is located between the two second end covers, and the stator assembly drives the mover assembly to cause each second guide rail of the two second guide rails to move along a corresponding first guide rail of the two first guide rails, such that the each second end cover of the two second end covers contacts a side wall of the limiting structure to realize limiting.

As an improvement, each first end cover of the two first end covers and the second end cover have rectangular structures, and the end faces of the first end cover and the second end cover close to each other have linear structures.

As an improvement, the limiting structure has a rectangular structure.

As an improvement, the stator assembly includes a slide fixed to a side of the first guide rail away from the mover unit and a first drive unit fixed to a side of the slide close to the mover unit; and the mover assembly includes a base fixed to a side of the second guide rail away from the stator unit and a second drive unit fixed to a side of the base close to the first drive unit, the second drive unit is arranged directly opposite to and apart from the first drive unit; and the first drive unit and the second drive unit generate mutual thrust to drive the second guide rail of the base to move linearly along the first guide rail of the slide.

As an improvement, the stator assembly further includes a first position feedback device fixed to a side of the slide close to the mover unit, and the mover assembly further includes a second position feedback device fixed to a side of the base close to the stator unit, the second position feedback device is arranged directly opposite to and apart from the first position feedback device and configured to read a position of the mover assembly relative to the stator assembly.

As an improvement, the first drive unit includes iron cores fixed to the slide and arranged along a length direction of the first guide rail and drive coils respectively wound around each of the iron cores; and the second drive unit includes a yoke fixed to the base and a plurality of permanent magnets fixed to a side of the yoke close to the drive coils, each of the permanent magnets is spaced apart from and directly opposite to one of the drive coils.

As an improvement, the first position feedback device is a linear encoder read head; and the second position feedback device is a linear encoder, the linear encoder is arranged apart from and directly opposite to the linear encoder read head.

Compared with the related art, in the direct drive transmission system of the disclosure, the stator unit drives the mover unit to realize linear motion. The two second guide rails of the mover unit respectively abut against the two first guide rails of the stator unit to form a slidable connection. A spaced surface of the first end cover of the stator unit and the second end cover of the mover unit has an orthographic plane structure. The direct drive transmission system further includes a limiting structure fixed to a side of the stator assembly close to the mover assembly, an end of the limiting structure close to each of the second end covers is located between the two second end covers, and the stator assembly drives the mover assembly to cause the second guide rails to move along the first guide rail, such that the second end cover contacts a side wall of the limiting structure to realize limiting. In this way, the spaced surface of the first end cover and the second end cover is a plane, such that the structure is simple, and manufacturing costs are low. At the same time, one end of the limiting structure is fixed to the mover assembly, and the other end of the limiting structure is arranged close to the second end cover, such that a contact area between the side wall of the limiting structure and the second end cover is large, a limit effecting is good, and reliability of the direct drive motor is further improved.

BRIEF DESCRIPTION OF DRAWINGS

In order to more clearly illustrate the technical solutions in the embodiments of the disclosure, the accompanying drawings used in the description of the embodiments will be briefly introduced below. It is apparent that, the accompanying drawings in the following description are only some embodiments of the disclosure, and other drawings can be obtained by those of ordinary skill in the art from the provided drawings without creative efforts.

DESCRIPTION OF EMBODIMENTS

The technical solutions in the embodiments of the disclosure will be clearly and completely described below with reference to the accompanying drawings in the embodiments of the disclosure. Obviously, the described embodiments are only part of instead of all of the embodiments of the disclosure. Based on the embodiments in the disclosure, all other embodiments obtained by those of ordinary skill in the art without creative efforts fall within the protection scope of the disclosure.

Figure 1:
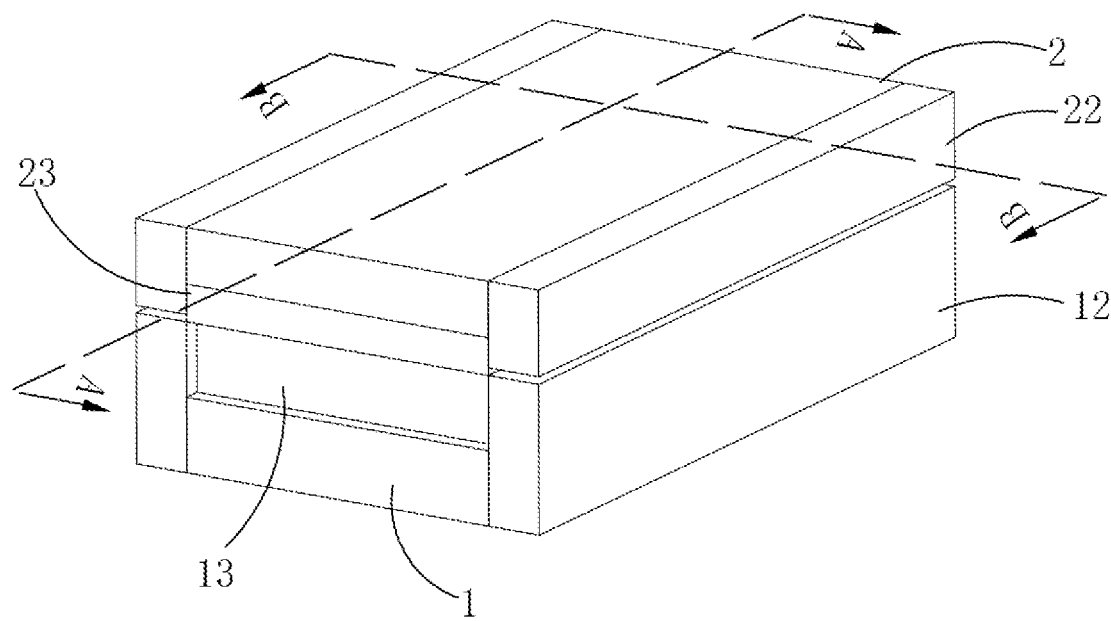
FIG. 1 is a schematic diagram of a three-dimensional structure of a direct drive transmission system according to the disclosure.
Figure 2:
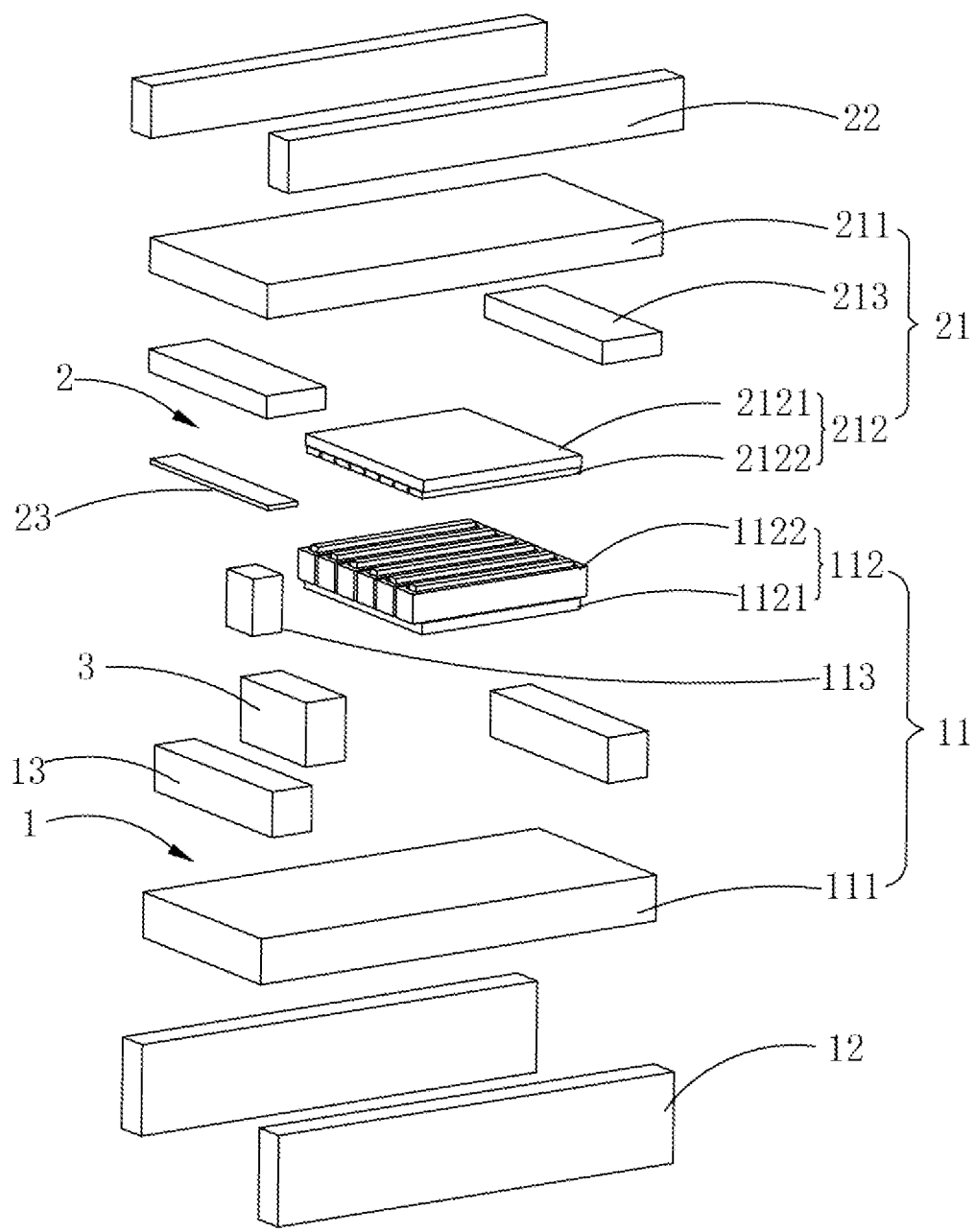
FIG. 2 is a schematic diagram of an exploded structure of the direct drive transmission system according to the disclosure.
Figure 3:
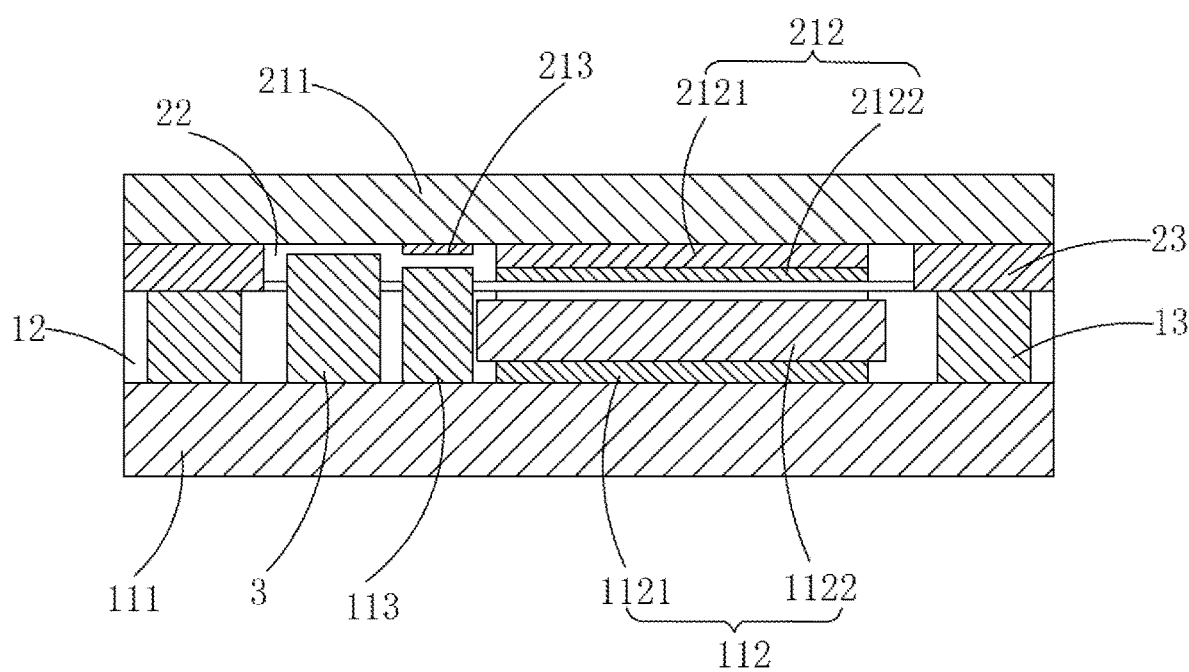
FIG. 3 is a sectional view taken along a line A-A in FIG. 1.
Figure 4:
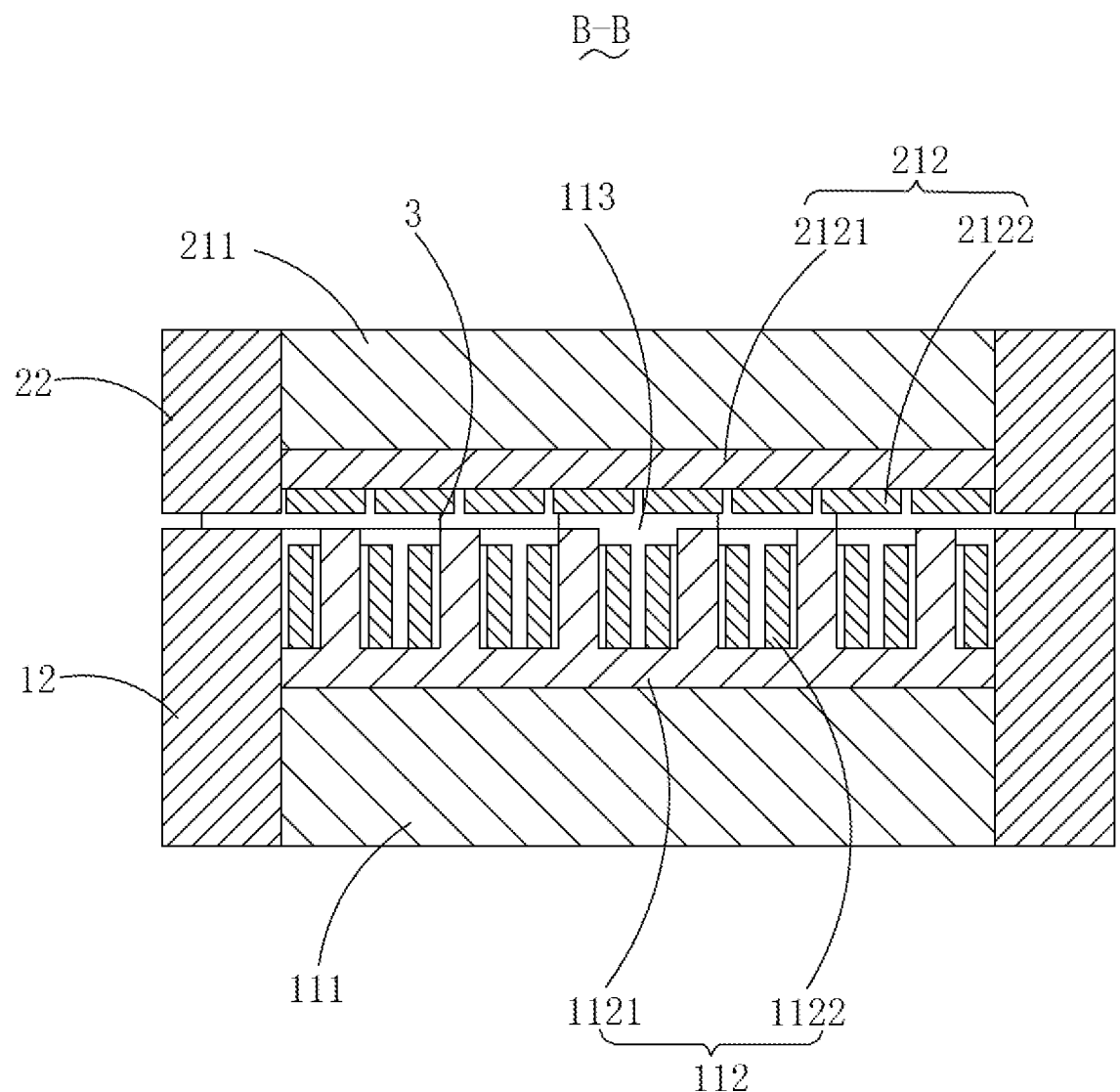
FIG. 4 is a sectional view taken along a line B-B in FIG. 1.

Referring to FIG. 1 to FIG. 4, a direct drive transmission system 100 is provided. The direct drive transmission system 100 includes a mover unit 2 and a stator unit 1 driving the mover unit 2 to move.

The stator unit 1 includes a stator assembly 11, two first end covers 12 fixed to two opposite circumferential sides of the stator assembly 11, and two first guide rails 13 fixed to a side of the stator assembly 11 close to the mover unit 2 and extending along a motion direction of the mover unit 2. The two first guide rails 13 are spaced apart in parallel.

The mover unit 2 includes a mover assembly 21, two second end covers 22 fixed to two opposite circumferential sides of the mover assembly 21, and two second guide rails 23 fixed to a side of the mover assembly 21 close to the stator unit 1 and extending along the motion direction of the mover unit 2. The two second guide rails 23 are spaced apart in parallel. The two second end covers 22 are respectively arranged directly opposite to and apart from the two first end covers 12, and the two second guide rails 23 respectively abut against the two first guide rails 13 to form a slidable connection, which facilitates the mover unit 2 to move linearly on the stator unit 1. A spaced surface of the first end cover 12 and the second end cover 22 has an orthographic plane structure. The spaced surface of the first end cover 12 and the second end cover 22 is plane, such that the structure is simple, and manufacturing costs are low.

A primary magnetic field is generated by the stator assembly 11, the stator assembly 11 and the mover assembly 21 are directly opposite to each other, and thrust generated between the stator assembly 11 and the mover assembly 21 is used to drive the second guide rail 23 of the mover unit 2 to move linearly along the first guide rail 13 of the stator unit 1.

As an improvement, a plurality of stator units 1 may be provided, and a plurality of mover units 2 may also be provided. The plurality of stator units 1 and the plurality of mover units 2 are arranged directly opposite and apart. The plurality of mover units 2 are driven by the plurality of stator units 1 to realize circular linear motion. The motion direction of the mover unit 2 can be controlled by adjusting a driving direction of a magnetic field of the stator unit 1.

The direct drive transmission system 100 further includes a limiting structure 3 fixed to a side of the stator assembly 11 close to the mover assembly 21, an end of the limiting structure 3 close to the second end cover 22 is located between the two second end covers 22, and the stator assembly 11 drives the mover assembly 21 to cause the second guide rail 23 to move along the first guide rail 13, such that the second end cover 22 contacts a side wall of the limiting structure 3 to realize limiting. In this way, the spaced surface of the first end cover 12 and the second end cover 22 is a plane, such that the structure is simple, and manufacturing costs are low. At the same time, one end of the limiting structure 3 is fixed to the mover assembly 21, and the other end of the limiting structure 3 is arranged close to the second end cover 22, such that a contact area between the side wall of the limiting structure 3 and the second end cover 22 is large, a limit effecting is good, and reliability of the direct drive motor is further improved.

In this embodiment, both the first end cover 12 and the second end cover 22 have rectangular structures, and end faces of the first end cover 12 and the second end cover 22 close to each other have linear structures. Therefore, the first end cover 12 and the second end cover 22 have simple structures and low manufacturing costs.

In this embodiment, the limiting structure 3 has a rectangular structure. It is convenient to mount and fix one end of the limiting structure 3 to the mover assembly 21 and cause the other end of the limiting structure 3 to correspond to the stator assembly 11, and a side surface between the side wall of the limiting structure 3 and the two first end covers 12 form a limiting contact, so as to realize a larger area of hard limiting, thereby improving the reliability of the direct drive motor.

The larger the contact area between the limiting structure 3 and the first end cover 12, the higher the reliability of the direct drive motor.

In this embodiment, the stator assembly 11 includes a slide 111 fixed to a side of the first guide rail 13 away from the mover unit 2 and a first drive unit 112 fixed to a side of the slide 111 close to the mover unit 2. The mover assembly 21 includes a base 211 fixed to a side of the second guide rail 23 away from the stator unit 1 and a second drive unit 212 fixed to a side of the base 211 close to the first drive unit 112. The second drive unit 212 is arranged directly opposite to and apart from the first drive unit 112. The first drive unit 112 and the second drive unit 212 generate mutual thrust to drive the second guide rail 23 of the base 211 to move linearly along the first guide rail 13 of the slide 111. Driving thrust is generated between the first drive unit 112 and the second drive unit 212, such that the base 211 fixed to the second drive unit 212 can move linearly under the action of the thrust. Certainly, when the base 211 is fixed, the slide 111 is correspondingly arranged on the base 211, and driving thrust is generated between the first drive unit 112 and the second drive unit 212, such that the slide 111 fixed to the first drive unit 112 can move linearly under the action of the thrust.

In this embodiment, the stator assembly 11 further includes a first position feedback device 113 fixed to a side of the slide 111 close to the mover unit 2, and the mover assembly 21 further includes a second position feedback device 213 fixed to a side of the base 211 close to the stator unit 1. The second position feedback device 213 is arranged directly opposite to and apart from the first position feedback device 113 and configured to read a position of the mover assembly 21 relative to the stator assembly 11. Through position information collection between the first position feedback device 113 and the second position feedback device 213, the mover assembly 21 can be positioned, and positioning accuracy is high.

In this embodiment, the first drive unit 112 includes a plurality of iron cores 1121 fixed to the slide 111 and arranged along a length direction of the first guide rail 13 and drive coils 1122 respectively wound around each of the iron cores 1121. When the drive coils 1122 generate current, the drive coils 1122 are activated to generate a traveling wave magnetic field to drive the second drive unit 212 to move. The drive coils 1122 are fixed in the iron cores 1121 to increase the magnetic field of the drive coils 1122, so as to better drive the second drive unit 212 to move linearly.

As an improvement, the drive coils 1122 are arranged side by side and evenly apart on a side of the iron core 1121 close to the second drive unit 212, so the magnetic field is uniform and a driving effect is good.

The second drive unit 212 includes a yoke 2121 fixed to the base 211 and a plurality of permanent magnets 2122 fixed to a side of the yoke 2121 close to the drive coils 1122. Each of the permanent magnets 2122 is spaced apart from and directly opposite to one of the drive coils 1122. The plurality of permanent magnets 2122 are fixed to one side of the yoke 2121, and the other side of the yoke 2121 is fixed to the base 211, such that a magnetic field force is always generated by the plurality of permanent magnets 2122. When an appropriate current is applied to the drive coil 1122, the drive coil 1122 generates a primary traveling wave magnetic field, the permanent magnet 2122 generates a secondary magnetic field, and thrust is generated between the drive coil 1122 and the permanent magnet 2122 to drive the base 211 to move linearly on the slide 111.

As an improvement, the plurality of permanent magnets 2122 are arranged side by side and fixed apart to the yoke 2121.

In this embodiment, the first position feedback device 113 is a linear encoder read head. The second position feedback device 213 is a linear encoder. The linear encoder is arranged apart from and directly opposite to the linear encoder read head. The linear encoder read head is configured to identify position information fed back by the linear encoder, so as to facilitate real-time positioning of the mover unit 2.

The linear encoder is an incremental linear encoder. A measurement principle of the linear encoder involves modulating light into Moire fringes through two gratings moving relative to each other, obtaining a displacement variation by counting and subdividing the Moire fringes, and setting one or more reference points on a ruler grating to determine positions.

As an improvement, the linear encoder is mounted on the mover unit 2, and the linear encoder has high feedback position accuracy. The linear encoder is arranged directly opposite to the reading head, such that the reading head can identify information of the linear encoder in real time, bringing high read and write identification efficiency and a good positioning effect.

As an improvement, the linear encoder is mounted on the base 211, the reading head is mounted on the slide 111, and the linear encoder is arranged directly opposite to the linear encoder read head to read position information of the mover unit 2 in real time, so as to facilitate the real-time positioning of the mover unit 2.

As an improvement, the linear encoder is an optical grating or a magnetic grating. The optical grating or magnetic grating has low costs. The linear encoder is not limited to the optical grating or magnetic grating.

Compared with the related art, in the direct drive transmission system of the disclosure, the stator unit drives the mover unit to realize linear motion. The two second guide rails of the mover unit respectively abut against the two first guide rails of the stator unit to form a slidable connection. A spaced surface of the first end cover of the stator unit and the second end cover of the mover unit has an orthographic plane structure. The direct drive transmission system further includes a limiting structure fixed to a side of the stator assembly close to the mover assembly, an end of the limiting structure close to each of the second end covers is located between the two second end covers, and the stator assembly drives the mover assembly to cause the second guide rails to move on the first guide rail, such that the second end cover contacts a side wall of the limiting structure to realize limiting. In this way, the spaced surface of the first end cover and the second end cover is a plane, such that the structure is simple, and manufacturing costs are low. At the same time, one end of the limiting structure is fixed to the mover assembly, and the other end of the limiting structure is arranged close to the second end cover, such that a contact area between the side wall of the limiting structure and the second end cover is large, a limit effecting is good, and reliability of the direct drive motor is further improved.

The above descriptions are only embodiments of the disclosure. It should be pointed out herein that, for those of ordinary skill in the art, improvements can also be made without departing from the creative concept of the disclosure, all of which fall within the protection scope of the disclosure.

What is claimed is:

1. A direct drive transmission system, comprising a mover unit and a stator unit driving the mover unit to move;
   wherein the stator unit comprises a stator assembly, two first end covers fixed to two opposite circumferential sides of the stator assembly, and two first guide rails fixed to a side of the stator assembly close to the mover unit and extending along a motion direction of the mover unit, the two first guide rails are spaced apart in parallel;
   wherein the mover unit comprises a mover assembly, two second end covers fixed to two opposite circumferential sides of the mover assembly, and two second guide rails fixed to a side of the mover assembly close to the stator unit and extending along the motion direction of the mover unit, the two second guide rails are spaced apart in parallel;
   wherein the two second end covers are respectively arranged directly opposite to and apart from the two first end covers, the two second guide rails respectively abut against the two first guide rails to form a slidable connection; wherein end faces of the two first end covers and the two second end covers close to each other have orthographic plane structures; and
   wherein the direct drive transmission system further comprises a limiting structure fixed to a side of the stator assembly close to the mover assembly, an end of the limiting structure close to the two second end covers is located between the two second end covers, and the stator assembly drives the mover assembly to cause each second guide rail of the two second guide rails to move along a corresponding first guide rail of the two first guide rails, in such a manner that each second end cover of the two second end covers contacts a side wall of the limiting structure to be limited.

2. The direct drive transmission system as described in claim 1, wherein each of the two first end covers has a rectangular structure, each of the two second end covers has a rectangular structure, and the end faces of the two first end covers and the two second end covers close to each other have linear structures.

3. The direct drive transmission system as described in claim 1, wherein the limiting structure has a rectangular structure.

4. The direct drive transmission system as described in claim 1, wherein
the stator assembly comprises a slide fixed to a side of the first guide rail away from the mover unit and a first drive unit fixed to a side of the slide close to the mover unit; and
the mover assembly comprises a base fixed to a side of the second guide rail away from the stator unit and a second drive unit fixed to a side of the base close to the first drive unit, wherein the second drive unit is arranged directly opposite to and apart from the first drive unit; and the first drive unit and the second drive unit generate mutual thrust to drive the second guide rail of the base to move linearly along the first guide rail of the slide.

5. The direct drive transmission system as described in claim 4, wherein
the stator assembly further comprises a first position feedback device fixed to a side of the slide close to the mover unit, and the mover assembly further comprises a second position feedback device fixed to a side of the base close to the stator unit, and
the second position feedback device is arranged directly opposite to and apart from the first position feedback device and configured to read a position of the mover assembly relative to the stator assembly.

6. The direct drive transmission system as described in claim 4, wherein
the first drive unit comprises iron cores fixed to the slide and arranged along a length direction of the first guide rail and drive coils respectively wound around each of the iron cores; and
the second drive unit comprises a yoke fixed to the base and permanent magnets fixed to a side of the yoke close to the drive coils, and each of the permanent magnets is spaced apart from and directly opposite to a corresponding drive coil of the drive coils.

7. The direct drive transmission system as described in claim 5, wherein the first position feedback device is a linear encoder read head; and the second position feedback device is a linear encoder, the linear encoder is arranged apart from and directly opposite to the linear encoder read head.

* * * * *